Oct. 9, 1962  W. E. BAKER  3,057,113
MODEL AIRCRAFT ARTICLE LAUNCHER
Filed Oct. 3, 1960

INVENTOR.
WILLIAM E. BAKER 3,057,113
MODEL AIRCRAFT ARTICLE LAUNCHER
William E. Baker, near Jamacha Junction, San Diego
County, Calif., assignor of fifty percent to William E.
Baker and Paula Baker, as joint tenants and fifty percent to Charles Wm. Brown, Jr., and Orpha H. Brown,
as joint tenants
Filed Oct. 3, 1960, Ser. No. 60,003
4 Claims. (Cl. 46—78)

The present invention relates to a model aircraft article launcher, and more particularly to such a launcher adapted to effect in-flight launching of an article by utilizing the means for rotating the propeller of the model aircraft.

According to the present invention, a model aircraft article launcher is provided which is made operative to launch the article by the means which is used to rotate the propeller, and wherein such launching takes place after the drive means for the propeller has expended a portion of its energy for driving the propeller. Thus, the launching of the article will take place during flight of the model aircraft.

More particularly, a release mechanism carried by the model aircraft is movable between a hold position and a release position, the release mechanism being maintained in its hold position by the tension of the drive means for the propeller. When the drive means has expended a predetermined portion of its energy in rotating the propeller, the release mechanism is free to move to its release position.

The article is supported upon an elongated member which is pivoted to the model aircraft, and a resilient element is connected between the article and the forward end of this elongated member so that the resilient element exerts its bias to oppose the bias of the drive means for the propeller. That is, the resilient element tends to move the release mechanism to its release position in opposition to the tendency of the drive means to move the release mechanism to its hold position. In addition, another resilient element is connected between the elongated member and the rearward end of the model aircraft, and exerts its bias to pivot the elongated member, and the article which it carries, away from the model aircraft.

The sequence of operation is such that as the drive means for the propeller loses its tension in driving the propeller, the bias of the resilient element connected to the article pivots the release mechanism to its release position. In this release position, the other resilient element is permitted to pivot the elongated member away from the model aircraft, and thus away from the release mechanism, so that the bias of the first resilient element launches the article. Further, the bias of the resilient elements may be varied, as desired, so that the bias of the drive means is overcome at different times during the flight of the model aircraft. That is, for example, if the resilient elements are rubber bands, a stronger pair of rubber bands will overcome the bias of the drive means more quickly and thereby launch the article sooner. Of course, the same effect may be achieved by stretching the bands further to different points of attachment.

The present launcher is adapted for use with the usual inexpensive balsa wood model aircraft, including gliders, rockets, and other similar vehicles. The present invention converts this usual type of model aircraft into a device which not only flies in the manner of the usual model aircraft, but toward the end of the flight of the model aircraft, launches an article. This article may be a smaller version of the first model aircraft, and both the large and small model aircraft will descend independently. Of course, the article launched could be a parachute, toy bomb, or the like, if desired.

As will be seen, the present article launcher is relatively inexpensive to manufacture, and is easy to operate. It is primarily intended for the entertainment of children, although it may be adapted to more complex forms of model aircraft if desired.

Other objects and features of the present invention will be readily apparent to those skilled in the art from the following specification and appended drawings wherein is illustrated a preferred form of the invention, and in which.

Figure 1:
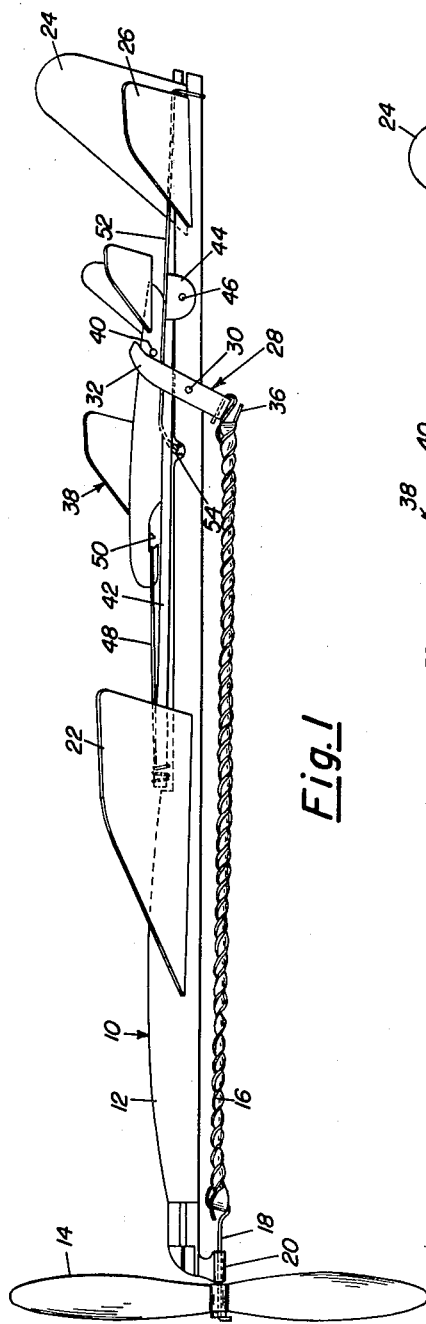
FIGURE 1 is a side elevational view of the model aircraft article launcher of the present invention, illustrating the article prior to launching.

Referring now to the drawings, the model aircraft article launcher of the present invention comprises, generally, a model aircraft 10 made of balsa wood or the like, and having an elongated fuselage 12 which rotatably carries a propeller 14 at its nose or forward end. Propeller 14 is driven or rotated by a bias means, resilient element, or rubber band 16 which is disposed about an end loop of a pin 18 which is rotatably disposed through a bearing member 20 suitably secured to the nose of fuselage 12. The forward end of pin 18 is disposed through the propeller 14, and is bent over at its end against the propeller 14 to prevent relative rotational movement between pin 18 and propeller 14.

Fuselage 12 includes usual wings 22 and a tail section at its rearward end, the tail section including a vertical stabilizer 24 and horizontal stabilizer 26. Stabilizers 24 and 26 are arranged through suitable slots in the tail of fuselage 12, and it is noted that fuselage 12 extends slightly beyond the rearward termini of stabilizers 24 and 26.

Figure 3:
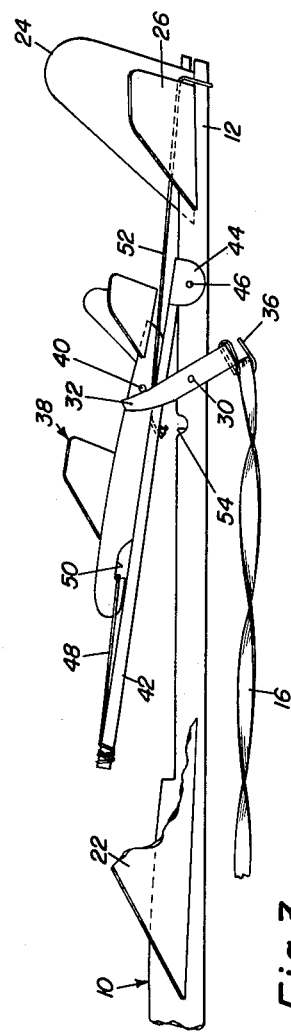
FIGURE 3 is a partial side elevational view of the launcher of FIGURE 1, but illustrating the position of the components at the moment of launching of the article.
Figure 2:
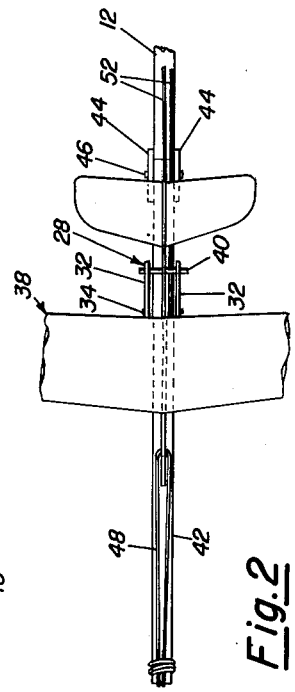
FIGURE 2 is a partial plan view of the apparatus of FIGURE 1, particularly illustrating the manner of connection of the article to the model aircraft.

An elongated release means or element 28 is carried by fuselage 12 between the tail section and wing 22 of the model aircraft, and is pivotable about a pin 30 which is transversely disposed through element 28 and fuselage 12. Element 28 includes a pair of side sections 32, FIGURE 2, arranged on either side of fuselage 12, sections 32 being secured together at their lower ends by a base section 34. Base section 34 carries a clip 36 which in turn carries the rearward end of rubber band 16. With this arrangement, rotation of propeller 14 will induce a twist in rubber band 16 which produces a tension or bias effective to pivot release element 28 to the "hold" position illustrated in FIGURE 1. When propeller 14 is released, it will be apparent that the twisted rubber band 16 will rotate propeller 14 until the energy thereof is expended, and the corresponding reduction of tension in rubber band 16 permits release element 28 to pivot to the "release" position illustrated in FIGURE 3. An article 38 is supported upon model aircraft 10, and in the present embodiment is illustrated as a small balsa wood glider which includes a pin 40 disposed transversely through article 38 and extending from opposite sides of the fuselage of article 38.

Article 38 is supported upon the model aircraft 10 by means which are connected to the model aircraft and which are releasaly engageable with article 38. This means comprises an elongated ramp or member 42 which includes a pair of side sections 44 at its rearward end, sections 44 extending on either side of fuselage 12. A pin 46 is disposed through sections 44 and through fuselage 12 to permit pivotal movement of member 42 upwardly and away from the model aircraft 10. Such means also include a resilient element or rubber band 48 which is secured in any suitable manner to the forward end of the elongated member 42, and which is stretchable into a notch 50 cut into the underside of the forward end or nose of article 38. This notch 50 includes a forwardly inclined face against which is carried the looped rubber band 48. Thus, rubber band 48 is disengageable from notch 50 when article 38 has substantially passed forwardly of the forward end of elongated member 42.

A second resilient element or rubber band 52 is looped over vertical stabilizer 24 and about the rearwardly projecting end of fuselage 12, and the forward portion of the loop of rubber band 52 is disposed through a suitable opening (not shown) in elongated member 42.

The forward portion of rubber band 52 is knotted at the under surface of member 42 to maintain band 52 in position, this knot conveniently being housed in a notch 54 cut into the upper surface of fuselage 12 so that member 42 may pivot flat against the upper surface of fuselage 12.

The bias of rubber band 52 tends to pivot member 42, and the article 38 which it carries, upwardly and away from model aircraft 10. However, it is noted that the rearwardly inclined angle or position of release element 28 in its hold position, together with the slightly rearwardly curving upper ends of sections 32 of release element 28, causes element 28 to engage pin 40 and prevent upward pivotal movement of member 42. Also, the release element 28 in its hold position prevents forward movement of article 38 by reason of such engagement between release element 28 and pin 40. The rearward holding position of the upper ends of sections 32 of release element 28 against pin 40 is established by locating pin 30 upwardly of the location of pin 40.

In operation, propeller 14 is rotated to twist rubber band 16 sufficiently to provide the duration of flight desired. This twisting of rubber band 16 places band 16 under tension and pivots release element 28 so that the upper end portions of release element 28 are rearwardly disposed. Next, the operator pivots elongated member 42 downwardly against the upper surface of fuselage 12, and article 38 is engaged with resilient elment 48. Article 38 is then pulled rearwardly, stretching element 48, to engage in pin 40 with the upper end portions of release element 28. In this position, the greater bias of rubber band 16 acts upon release element 28 to keep article 38 from moving either upwardly or forwardly.

The model aircraft 10 is then launched in the usual manner, and propeller 14 simultaneously released for rotation. During the flight of the model aircraft 10, the energy of rubber band 16 will be expended in rotating the propeller 14. Soon the bias exerted by rubber band 16 becomes less than that of rubber band 48, and article 38 is urged forwardly by band 48, carrying release element 28 forwardly with it. Pin 40 next becomes disengaged from release element 28, and rubber band 52 pivots elongated member 42 upwardly substantially simultaneously with the launching action of rubber band 48. Thus, article 38 is pivoted upwardly and pulled forwardly to launch it during the flight of model aircraft 10. Bands 48 and 52 are selected or stretched such that their resilience upon stretching will overcome the bias of band 16 at the time desired, so that the article launching occurs at a predetermined time during the flight of model aircraft 10.

From the description hereinabove made, it is seen that a relatively inexpensive model aircraft article launcher has been provided. It is simple to operate, and effects the launching of an article during the course of flight of a larger model aircraft.

While a certain preferred embodiment of the invention has been specifically disclosed, it is understood that the invention is not limited thereto as many variations will be readily apparent to those skilled in the art and the invention is to be given its broadest possible interpretation within the terms of the following claims:

I claim:

1. A model aircraft article launcher comprising: a model aircraft having a propeller; an article; release means carried by said model aircraft and movable between a hold position and a release position, said release means in said hold position being in engagement with said article, and in said release position being disengageable from said article; first means connected to said model aircraft and releasably engageable with said article, said first means including first resilient means in a condition of stress when said release means is in said hold position, and operative to suddenly expend its stress to launch said article when said release means is in said release position; and second means connected to said propeller and to said release means, said second means including second resilient means operative in a condition of stress to maintain said release means in said hold position and to expend its stress to rotate said propeller and permit movement of said release means to said release position, said first means including an elongated member supporting said article and pivotally mounted at one end to said model aircraft; said first resilient means being connected to said elongated member and releasably engageable with said article; and third resilient means connected to said elongated member and to said model aircraft and operative in a condition of stress to pivot said elongated member and said article away from said model aircraft when said release means is in said release position.

2. A model aircraft article launcher comprising: a model aircraft having a propeller; an elongated member pivotally carried by said model aircraft; an article supported by said elongated member; an elongated release element pivotally carried by said model aircraft; first bias means connected to said propeller and to one end portion of said release element, and operative to exert its bias to pivot said release element to move the opposite end portion of said release element into engagement with said article; second bias means connected to said elongated member and releasably engageable with said article and operative to exert its bias to pivot said opposite end portion of said release element out of engagement with said article to launch said article; third bias means connected to said elongated member and to said model aircraft, and operative to exert its bias to pivot said elongated member away from said model aircraft, the bias of said first bias means being expended upon flight rotation of said propeller to thereby render said first means inoperative and render said second means operative whereby said third bias means is rendered operative to pivot said elongated member for launching said article away from said model aircraft.

3. A model aircraft article launcher comprising a model aircraft having a propeller at its forward end; an elongated member pivotally carried at its rearward end by said model aircraft; an article slidably supported by said elongated member; an elongated release element pivotally carried by said model aircraft; a first rubber band connected to said propeller and to the lower end of said release element, and twistable by said propeller to rearwardly pivot the upper end of said release element into engagement with said article to prevent forward and upward movement thereof; a second rubber band connected to the forward end of said elongated member and stretched for releasable connection to said article whereby said second rubber band exerts a tension upon said release element tending to forwardly pivot the upper end of said release element, against the tension of said twisted first rubber band, to disengage said article; a third rubber band connected to said elongated member forwardly of its rearward end and stretched for connection to the tail section of said model aircraft whereby said third rubber band exerts its tension to upwardly pivot the forward end of said elongated member; said first rubber band being untwistable upon release of said propeller to rotate said propeller and permit the tension of said second rubber band to forwardly pivot the upper end of said release element whereby said third rubber band upwardly pivots the forward end of said elongated member and said second rubber band exerts its tension to forwardly launch said article.

4. A model aircraft article launcher according to claim 3 and characterized in that said article includes a transversely disposed pin normally engageable with the rearward edge surface of said upper end of said release member, and located rearwardly of the point of pivotal connection of said release element to said model aircraft.

References Cited in the file of this patent

FOREIGN PATENTS 826,425   France ---------------- Jan. 4, 1938